May 22, 1956 J. R. HOLLINS 2,747,174
FLASHING DIRECTION SIGNALLING SYSTEMS FOR VEHICLES
Filed June 8, 1953
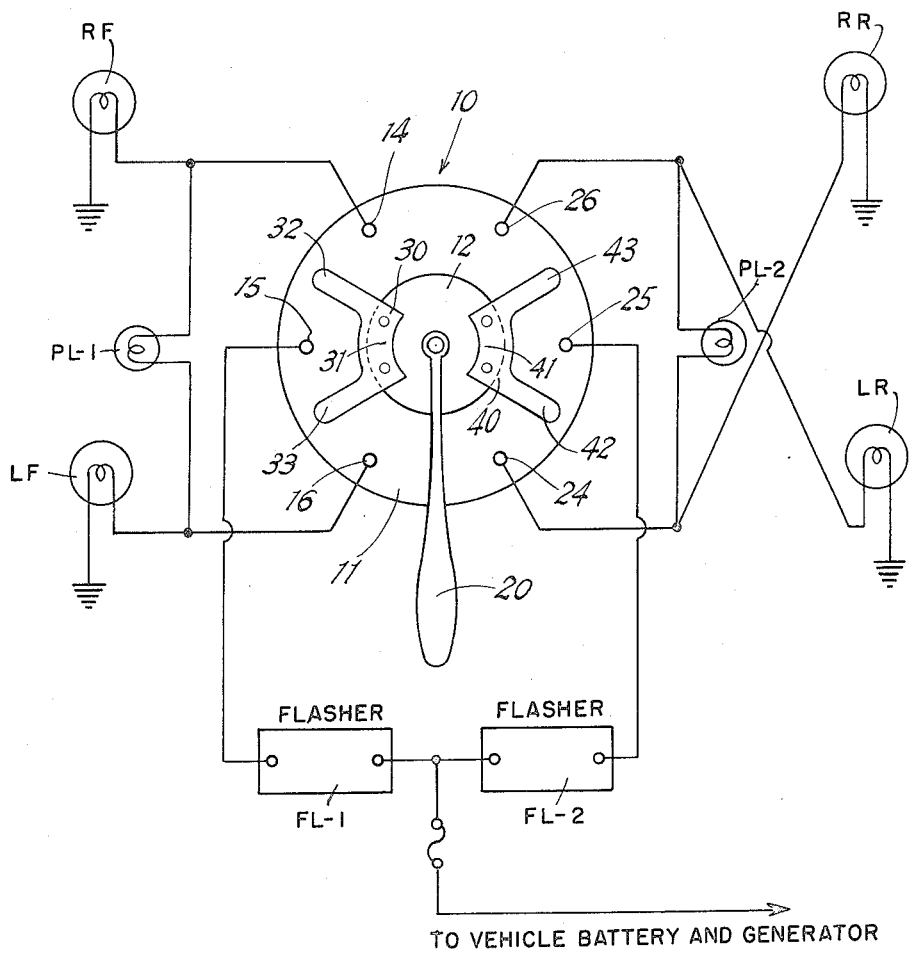

2,747,174
Patented May 22, 1956

---

2,747,174

FLASHING DIRECTION SIGNALLING SYSTEMS FOR VEHICLES

Jesse R. Hollins, Brooklyn, N. Y.

Application June 8, 1953, Serial No. 360,240

4 Claims. (Cl. 340—81)

---

This invention relates to flashing direction signalling systems for vehicles and, more particularly, to an improved system wherein the current load on the flasher contacts is kept at a minimum and substantially constant value.

In the usual direction signalling system, the contacts of the selector switch carry a relatively heavy current, even though the lamp load, in a selected position of the switch, may be divided between a pair of contacts. The making and breaking of the lamp circuits under such load rapidly deteriorates the contacts due to arcing and burning.

More importantly, all the signal lamp load is carried by a single flasher and usually by a single pair of flasher contacts. As the flasher, for proper operation, must be made more delicate than the selector switch, the contact deterioration of the flasher is even more rapid than that of the selector switch contacts.

Another cause of flasher malfunctioning is the change in load on the flasher contacts, particularly characteristic of tractor-trailer combinations. When the trailer is hitched to the tractor, the flasher carries the signal lamp load of both the tractor and the trailer. However, when the trailer is disconnected, as during unloading at terminals, the flasher carries only the load of the tractor signal lamps.

This change in flasher current load has a deleterious effect on the flasher contacts. Additionally, the difference in current loads under the mentioned conditions makes it difficult or impossible to design the flasher for optimum performance, and the load variations result in corresponding variations in the signal lamp brightness. This is detrimental to the life of the signal lamps.

In accordance with the present invention, the flasher contact life and lamp life is increased, and better design of the flasher is made possible, by using a pair of flashers each controlling one set of signal lamps such as the front lamps or the rear lamps. The current division between the two flashers results in less load on the flasher contacts. Additionally, the flasher current load as well as the lamp current is maintained substantially constant even though, for example, a tractor is operated with and without a trailer.

In a preferred embodiment of the invention, one flasher is in circuit with the front mounted signal lamps, as on a tractor, and the other flasher is in circuit with the rear or trailer mounted signal lamps. Each flasher can therefore be designed with the proper resistance and other characteristics to handle a predetermined constant lamp load, as each flasher handles the same constant total lamp current during any signalling operation irrespective of whether the tractor and trailer are connected or the tractor is operated independently of the trailer. The current to each set of signal lamps can correspondingly be maintained at the optimum value for proper illumination and long life.

For an understanding of the invention principles, reference is made to the following description of a typical embodiment thereof as illustrated in the accompanying drawing. In the drawing, the single figure is a schematic wiring diagram of the invention signalling arrangement.

Referring to the drawing, a selector switch 10 is provided having a preferably circular dielectric base 11 carrying two sets of contacts 14, 15, 16 and 24, 25, 26. Lamp contacts 14 and 16 are connected to the grounded front signal lamps RF and LF, respectively, and contacts 24 and 26 are connected to the grounded rear signal lamps RR and LR respectively. Thus, each signal lamp is connected to a separate switch contact. In a typical arrangement, lamps RF and LF may be mounted on the front end of a tractor and lamps RR and LR may represent the trailer signal lamps which are disconnected from switch 10 when the trailer is disconnected from the tractor.

Flasher contacts 15 and 25 are connected to the shunt terminals of flashers FL–1 and FL–2, respectively, these flashers having their live terminals connected in parallel to the vehicle battery and generator. It will be noted that the contacts of each set are arranged substantially 60° from each other for a purpose to be described.

Rotatably mounted concentrically of base 11 is a contact strip carrying dielectric disc 12 to which is secured the operating lever 20 for switch 10. At diametrically opposite zones, dielectric disc 12 carries contact bridging members or connectors 30 and 40, of conductive material. Each bridging member comprises an arcuate base portion 31 or 41 integral with a pair of radial arms 32, 33 or 42, 43. The radial arms diverge at an angle of substantially 60° and, in the off position, are disposed midway between the central and end contacts of each set of contacts on base 11.

The arrangement operates in the following manner. To signal a left turn, lever 20 is moved substantially 30° counter-clockwise, whereupon member 30 interconnects contacts 15 and 16 and member 40 interconnects contacts 25 and 26. Left front lamp LF is thus connected to flasher FL–1 and left rear lamp LR is connected to flasher FL–2. Each flasher thus flashes one signal lamp. A corresponding effect is secured when lever 20 is moved clockwise to signal a right turn. Should the trailer be disconnected from the tractor, and thus the lamps RR and LR be disconnected from switch 10, the lamp load on flasher FL–1 remains the same as before. Thereby, the flashers may be designed for a specific and constant lamp load, and contact life is greatly lengthened due to division of the lamp load between two flashers.

Pilot lamp PL–1 is connected across contacts 14 and 16, and pilot lamp PL–2 is connected across contacts 24 and 26. When a left turn is signalled, high resistance lamp PL–1 is flashed through lamp RF, and high resistance lamp PL–2 through lamp RR. The current flow is insufficient to illuminate either signal lamp RF or RR. Alternatively, the pilot lamps may be connected to the relay contact of the associated flasher.

While a specific embodiment of the invention has been shown and described in detail to illustrate the application of the invention principles, it will be understood that the invention may be embodied otherwise without departing from such principles.

What is claimed is:

1. A direction signalling arrangement for automotive vehicle units including a first set of signal lamp means mounted on either side of the front of the unit; a second set of signal lamp means mounted on either side of the rear of the unit; a pair of flashers connected to the vehicle electric energy source; a direction signal switch having first and second sets of contacts, each contact set including lamp contacts respectively connected to the lamp means on each side of a different end of the vehicle unit, and a flasher contact, each flasher contact being connected to a different one of said flashers; and selector means selectively operable to simultaneously connect one of the flasher contacts to the associated lamp contact connected to the signal lamp means on one side of the front of the vehicle unit and the other flasher contact to the associated lamp contact connected to the signal lamp means on said one side of the rear of the vehicle unit.

2. A direction signalling arrangement for automotive vehicle units including a first set of signal lamp means mounted on either side of the front of the unit; a second set of signal lamp means mounted on either side of the rear of the unit; a pair of flashers connected to the vehicle electric energy source; a direction signal switch having a pair of flasher contacts each connected to a different flasher and two pairs of lamp contacts each associated with a different flasher contact, one contact of each pair of lamp contacts being connected to a signal lamp means on a different side of one end of the vehicle unit and each contact of the other pair of lamp contacts being connected to the signal lamp means on a different side of the other end of the vehicle unit; and selector means operable to simultaneously connect one lamp contact of each pair to its associated flasher contact.

3. A direction signalling arrangement for automotive vehicle units including a first set of signal lamp means mounted on either side of the front of the unit, a second set of signal lamp means mounted on either side of the rear of the unit; a pair of flashers connected to the vehicle electric energy source; a direction signal switch having two sets of contacts, each set including a flasher contact each connected to a different flasher and a pair of lamp contacts each connected to a lamp means on a different side of one end of the vehicle unit, each contact set controlling the signal lamp means on a different end of the vehicle unit; and selector means operable to simultaneously connect one lamp contact of each pair to its associated flasher contact.

4. A direction signalling arrangement for automotive vehicle units including a first set of signal lamp means mounted on either side of the front of the unit; a second set of signal lamp means mounted on either side of the rear of the unit; a pair of flashers connected to the vehicle electric energy source; a direction signal switch having two sets of contacts, each set including a flasher contact each connected to a different flasher and a pair of lamp contacts each connected to a lamp means on a different side of one end of the vehicle unit, each contact set controlling the signal lamp means on a different end of the vehicle unit; means movably mounted on said switch and carrying a pair of bridging elements each associated with a different set of contacts; and a selector device selectively operable to move said last named means to position said bridging elements to simultaneously connect one lamp contact of each pair to its associated flasher contact.

References Cited in the file of this patent

UNITED STATES PATENTS

| | | |
|---|---|---|
| 1,594,474 | Slayton | Aug. 3, 1926 |
| 1,848,685 | Wyatt | Mar. 8, 1932 |
| 2,201,657 | Westlund | May 21, 1940 |
| 2,607,840 | Hollins | Aug. 19, 1952 |